United States Patent [19]

Huntington

[11] Patent Number: 4,525,948
[45] Date of Patent: Jul. 2, 1985

[54] FISHING LURE ARRANGEMENT

[76] Inventor: William Huntington, SR Box 80123, Fairbanks, Ak. 99701

[21] Appl. No.: 516,975

[22] Filed: Jul. 25, 1983

[51] Int. Cl.³ ............................................. A01K 85/02
[52] U.S. Cl. .................................. 43/42.04; 43/42.41; 43/44.82
[58] Field of Search ...................... 43/42, 42.44, 42.45, 43/43.16, 43.4, 42.02, 42.09, 42.38, 44.82, 42.04, 43/42.41

[56] References Cited

U.S. PATENT DOCUMENTS

| | | | |
|---|---|---|---|
| 2,123,598 | 7/1938 | Eliason | 43/43.4 |
| 2,196,555 | 4/1940 | Heiman | 43/42.04 |
| 2,588,400 | 3/1952 | McRoberts | 43/42.04 |
| 3,541,720 | 11/1970 | Buffet | 43/44.82 |
| 4,064,646 | 12/1977 | Vercellone | 43/42.41 |

Primary Examiner—Gene P. Crosby
Attorney, Agent, or Firm—Neil J. Driscoll

[57] ABSTRACT

A fishing lure has an internal longitudinal cavity that normally received the stems and eyelet segment of a composite multi-hook. The bowed hooks project externally of the lure body. An abutment is placed at the external opening of the cavity, the abutment being embraced by the stems to provide continuous frictional engagement between the stems and the abutment during relative longitudinal movement between the multi-hook and lure body. The resistance to hook movement inhibits the attacking fish from throwing the hook until the hook eyelet engages the abutment abruptly halting the relative movement and ensuring good hook penetration.

5 Claims, 8 Drawing Figures

FISHING LURE ARRANGEMENT

BACKGROUND OF THE INVENTION

1. Field of the Invention

The invention relates to the general field of fishing lures and particularly to an arrangement designed to resist the fish throwing the hook and provide excellent hook penetration into the attacking fish.

2. Description of the Prior Art

The concept of allowing a fish hook on a lure to move longitudinally and rearwardly of the lure under fish attack, and to then provide structure to abruptly stop the moving hook has been taught in many prior art lure arrangements. The theory is that the abrupt stop induces better hook penetration and therefor improves fishing success. Moving hook structures are shown, for example, in U.S. Pat. Nos. 2,196,555 and 2,588,400, dated Apr. 9, 1940 and Mar. 11, 1952, respectively. Typically, these devices employed a spring clip to engage the eye of a hook while the hook was in retracted position in relation to the lure. The striking fish would cause the eye to escape from under the spring clip and the hook was free to move its full stem length, usually through a small opening until the hook eye engages the small opening structure, which abruptly halts hook movement inducing hook penetration. The problem with these units is that the fish could frequently dislodge the hook as the hook stem moved through the small opening. The hook may be thrown by the fish before the abrupt stop occured.

A unique feature of the herein inventive lure is a novel, motion resistive moving hook structure coupled with an abrupt stop device to aid fish penetration. The hook and cooperating structure is such that a stem or shaft memory, spring tension is present throughout virtually the full longitudinal movement of the hook. This creates an increasing resistance to hook movement. With no free hook movement the attacking fish is impeded from the throwing the hook during said movement. The last and very short increment of hook movement is free, however, ie., without resistance. This free movement is only long enough to increase the hook velocity and impact upon abrupt stop and thereby increase the effectiveness of hook penetration.

Another feature of the movable hook is, that in its retracted position, the hook stem and the eye thereof is a positioned in a central cavity in the lure body. Specifically, the hook is a two hook design having a single eyelet and two generally parallel stems projecting from the single eyelet to the respective hooks. A vertical member or stop is placed adjacent the outer opening of the central cavity and is slightly thicker than the space between the generally parallel hook stems so that with the stems telescopically received in the central cavity the stems are in spring pressured engagement with the vertical stop member. It is the spring pressure thus created that resists, yet allows, movement of the hooks out of the cavity in the lure body. As the hook is resistively removed from the cavity during fish attack, the hook eyelet is moved into embracing engagement with the vertical stop member which abruptly halts hook movement and aiding in hoop penetration. Also the fact that the vertical stop member is wider than the space between the parallel stems, induces a horizontal seperating movement between the two hooks during resistive movement of the hooks from the cavity.

It will be apparent to skilled fisherman that the lure herein disclosed provides unique functional features and has as its general object greatly improved fishing efficiency.

Other advantages and features of the invention will become apparent in the course of the following description of a presently preferred embodiment of the invention.

DESCRIPTION OF A PREFERRED EMBODIMENT

Figure 1:
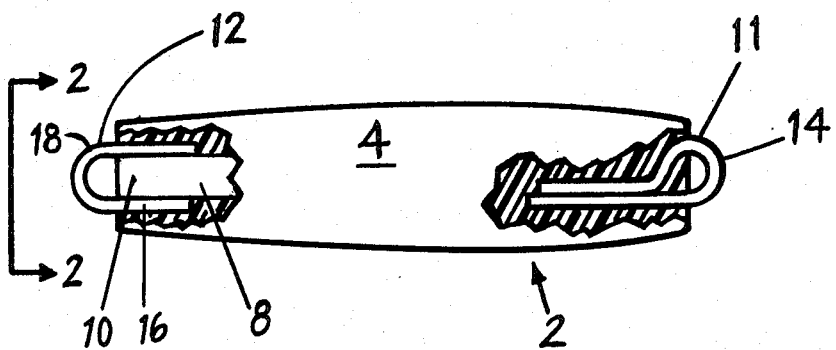
FIG. 1 is a partially fragmentary side elevational view of the lure body used in the invention.
Figure 2:
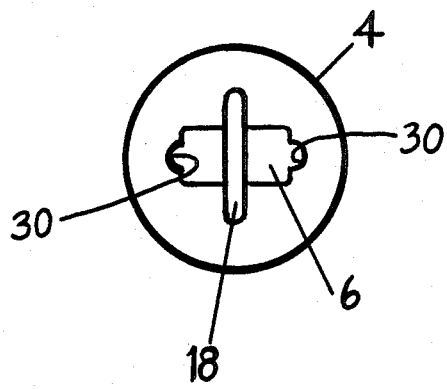
FIG. 2 is an end elevational view taken along line 2—2 of FIG. 1.
Figure 3:
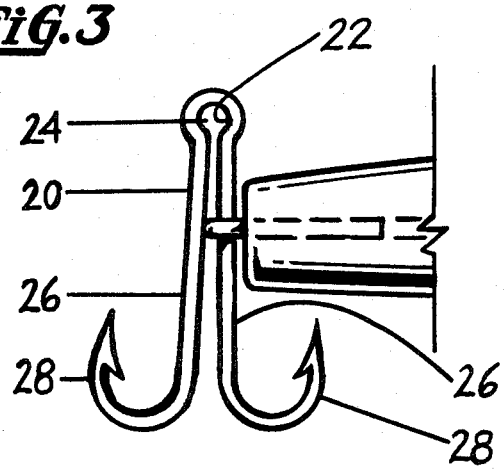
FIG. 3 is a fragmentary plan view of the rear aspect of the lure illustrating how the hook is assembled and removed from the frame member.

In the drawings a fully structured invention lure is indicated generally by the numeral 2.

The lure 2 comprises a body 4, preferably of molded plastic, for example, polyurathane. An opening 6 is provided at the rear aspect of the body 4 and extends into the body 4 of the lure to define central cavity 8. Between the opening 6 and the cavity 8 a hook stem channel 10 establishes communication between the opening 6 and cavity 8.

A hook and line connection member 11 is molded within the body 4 of the lure. A frame member 12 is molded into the rear at the lure. Member 11 is bent to form an eye 14 which projects above the front surface of the body 4 and provides means for connection of a fishing line or leader (not shown). At the rear of the body 4, the frame member 12 is generally U-shaped as seen in side elevational view and at 16, and is so molded in the body 4 so as to define the upper and lower segments of the channel 10 and cavity 8. A vertical segment 18 of the U-shaped portion projects rearwardly and outwardly from the body 4 and functions as an abrupt stop segment for the longitudinally moving fishhook 20 as will be hereinafter described.

Figure 7:
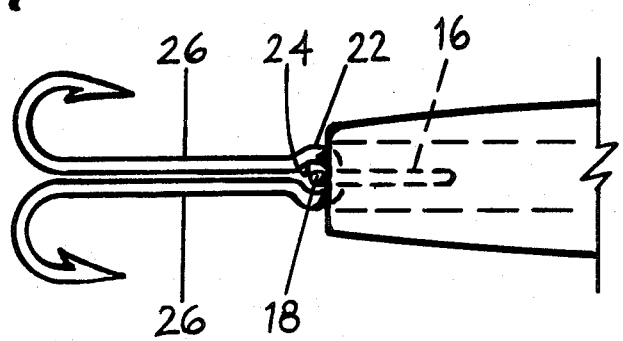
FIG. 7 is a view similar to FIG. 6, showing the hook fully extended with the stop member in the eyelet to prevent further longitudinal hook movement.

Attention is now directed to FIGS. 3 through 8 inclusive. In the preferred embodiment the hook 20 is preferably a 2 gang hook having a curved eyelet 22 defining a central hole 24 at its rear aspect and projecting two bifurcated stems 26, 26 forwardly in generally parallel and close adjacency to each other. The stems 26, 26, at the outer end of the hook 20, are formed into conventional curved or bow portions 28, 28 which may or may not be barbed. The bow portions 28,28 are positioned to define an included angle of about 100 degrees. As shown in the drawings, the hook 20 may be assembled to the frame member 12 by inserting one of the hook bow portions 28 through the loop formed by the vertical stop segment 18 of the member 12. The segment 18 is moved along the stems 26,26 until the eyelet opening 24 loosely receives the segment 18 (FIG. 7). As shown in FIG. 7, the hook thus assembled is capable of hemispherical motion in relation to the rear of the lure body 4.

Normally, the stems 26,26 and eyelet 22 are deposited in the channel 10. Stop segment 18 is wider than the space between stems 26. Therefore stems 26,26 frictionally engaging the vertical segment 18 of the frame member 12. Additionally the channel 10 is provided with opposed grooves 30,30 which receive the outwardly projecting sides of the eyelet 22.

Figure 4:
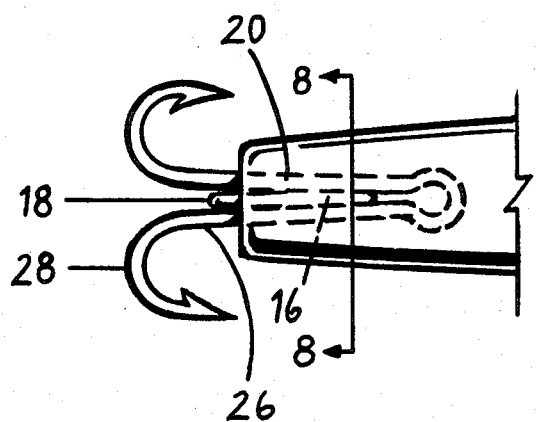
FIG. 4 is a fragmentary plan view, similar to FIG. 5, except showing the hook stems fully telescoped within a central cavity of the lure body.
Figure 5:
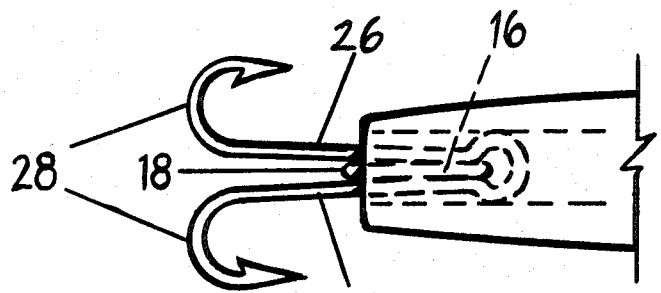
FIG. 5 is a view, similar to FIG. 4, showing the hook partially removed from the central cavity and illustrating the horizontal separating movement of the respective stems.
Figure 6:
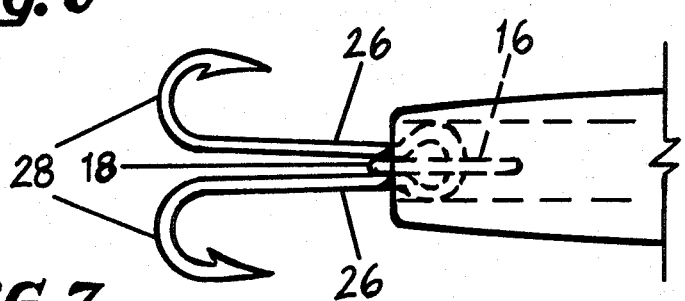
FIG. 6 is a view similar to FIG. 5, showing the hook almost fully removed from the central cavity with the stop member about to enter the single hook eyelet.

Upon fish strike at the lure, hook movement will occur from the fully retracted position shown in FIG. 4. Initial motion of the hook 20 is resisted by medium frictional resistance of the stems 26,26 and spring engagement with the segment 18 adjacent the hook bows, and as shown in FIG. 5. Continued hook movement brings those portions of the stems 26,26 close to the eyelet 22, to engage the segment 18 increasing frictional resistance and resistance to hook motion. (FIGS. 5 and 6) When the eyelet hole 22 reaches the segment 18, the hole 24 allows a brief period of free hook movement. (See FIG. 7). This tends to increase the velocity of the hook. The eyelet 22 then engages the segment 18 abruptly halting the hook motion and inducing positive hook penetration. During all of this longitundinal movement, the hook bow portions 28,28 are induced to horizontally separate until the eyelet 22 engages the segment 18 when they abruptly return to the spring memory position.

Figure 8:
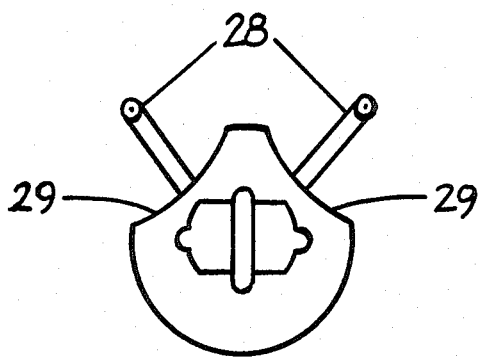
FIG. 8 is a sectional view taken along line 8—8 of FIG. 4.

As noted above, the respective bow portions 28 of the hooks define an included angle of about 100 degrees (FIG. 8). It is also desirable to have as much space or clearance between the pointed tips of the bow hook portions and the body 4 of the lure. For this reason concave depressions 29 may be provided in the body 4 at the rear aspect of the body 4 and as shown in FIG. 8.

The above described presently preferred embodiment is by way of illustration and not limitation and the invention may be subject to modification all within the spirit and scope thereof.

What is claimed is:

1. In a fishing lure
a lure body,
multi-gang hooks including multi-stems, each stem extending to a respective hook,
said multi-stems terminating in a single eyelet,
abutment means on the lure body and being embraced by said multi-stems so that limited relative longitudinal movement between hooks and the lure body is accomdated,
at least some of said multi-stems frictionally and continuously engaging said abutment means during said relative longitudinal movement thereby providing continuous frictional resistance to said movement,
said eyelet being adapted to engage said abutment means and thereby halt said relative longitudinal movement between the hooks and the lure body, a cavity in the lure body, channel means from the outer surface of the lure and communicating with the cavity, and said channel means being adapted to telescopically receive said stems.

2. A fishing lure according to claim 1, wherein
said abutment means is aligned with the channel means and adjacent the surface of the lure.

3. In a fishing lure, the combination of
a lure body,
an opening on the lure body communicating with a channel within the lure body,
a hook arrangement including a single eyelet,
at least a pair of hook stems integral with and projecting from the eyelet,
abutment means aligned with the opening and secured to the lure body,
said hook stems being disposed in the channel and arranged to frictionally engage the abutment means during relative longitudinal movement between the hook arrangement and the lure body thereby providing continuous frictional resistance to said longitudinal movement and during all of said movement until the eyelet engages the abutment means thereby halting said longitudinal movement.

4. A fishing lure according to claim 3, wherein
said abutment means comprises a wirelike element mounted on the lure body and projecting outwardly of said opening.

5. A fishing lure according to claim 4, wherein
said hook arrangement comprises two hooks,
said hooks defining therebetween an included angle of greater than 90 degrees and less than 180 degrees as seen in end elevational view.

* * * * *